United States Patent [19]

Aston et al.

[11] 4,239,382
[45] Dec. 16, 1980

[54] PHOTOGRAPHIC PRINTING OR ENLARGING APPARATUS

[75] Inventors: Keith Aston, Banstead; John G. Long, Leatherhead, both of England

[73] Assignee: Durst (U.K.) Ltd., Epsom, England

[21] Appl. No.: 34,418

[22] Filed: Apr. 30, 1979

[30] Foreign Application Priority Data

May 31, 1978 [GB] United Kingdom .............. 25068/78

[51] Int. Cl.³ ...................... G03B 27/52; G02B 15/14; G02B 7/04
[52] U.S. Cl. ..................................... 355/63; 354/195; 350/187; 350/255
[58] Field of Search ................................... 355/55-63; 354/195, 289; 352/140; 350/187, 247, 254, 255, 257

[56] References Cited

U.S. PATENT DOCUMENTS

| 2,239,760 | 4/1941 | Simmon | 355/63 X |
| 3,228,284 | 1/1966 | Kallenberg | 355/63 |
| 3,584,951 | 6/1971 | Fujimoto | 355/63 |
| 3,856,398 | 12/1974 | Taylor | 355/63 |
| 4,061,424 | 12/1977 | Onishi | 355/63 |

Primary Examiner—L. T. Hix
Assistant Examiner—W. J. Brady
Attorney, Agent, or Firm—Cahill, Sutton & Thomas

[57] ABSTRACT

A photographic printing or enlarging apparatus incorporates a negative carrier, a lens stage, and a positioning device for positioning the lens stage toward and away from a negative carrier. The positioning device comprises a body and one or more push rods each of which is mounted on, and releasably secured to, the body for movement in the direction of its length. A selected push rod is positioned to engage the lens stage, or a part of the apparatus connected to the lens stage, to fix the position of the stage relative to the negative carrier in accordance with the predetermined setting of the selected push rod. The positioning device may incorporate a plurality of push rods or may incorporate a single push rod that may selectively be extended and locked in an extended position to contact a portion of the apparatus connected to the lens stage for fixing the distance between the lens stage and the negative carrier.

7 Claims, 7 Drawing Figures

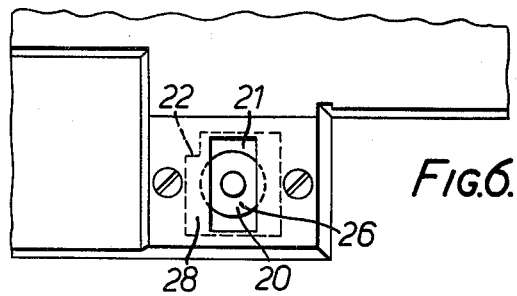
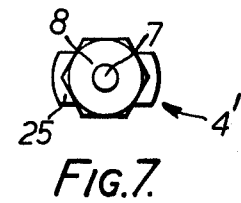
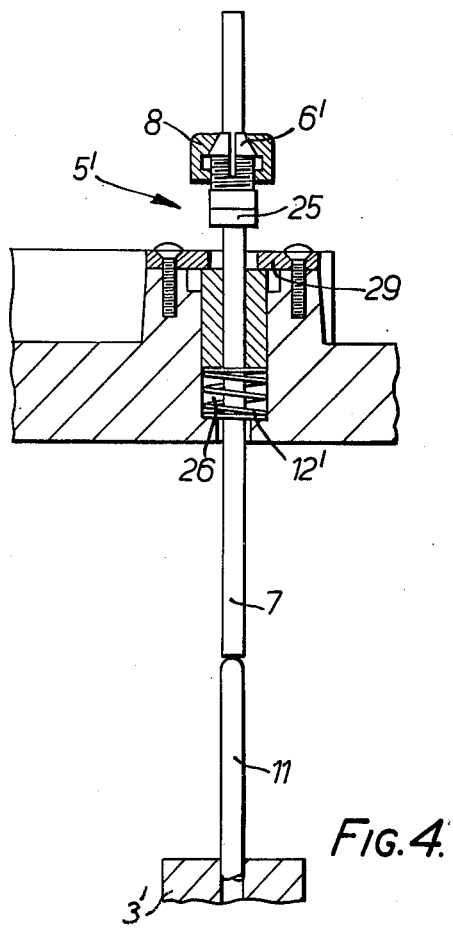
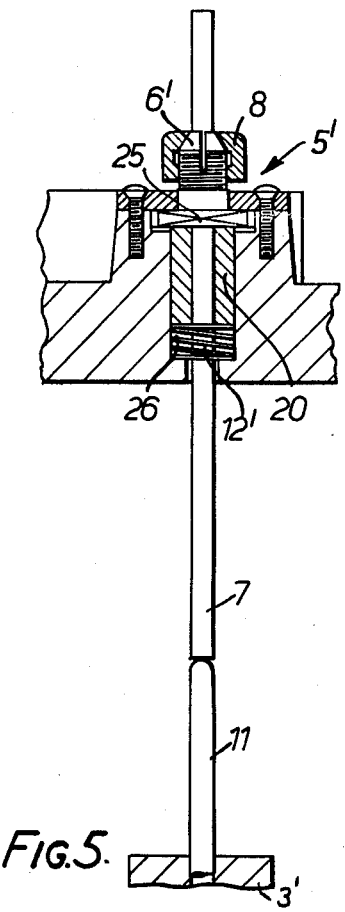

PHOTOGRAPHIC PRINTING OR ENLARGING APPARATUS

This invention relates to the location of the objective lens in photographic printing or enlarging apparatus, in one of a plurality of discrete positions situated at different distances from the plane of the photographic film held by the carrier.

When it is desired to make prints of different sizes from negatives or transparencies of the same size, for each print size the plane of the printing paper and the objective lens will have to be in particular positions relative to the negative in order to obtain on the printing paper a sharply focused image of the desired size.

It is known to provide a cam mechanism for automatically adjusting the position of the objective lens when the printer or enlarger is set to a given magnification; however, the required position of the objective lens depends on its focal length, and there are variations in focal length between different lenses of the same nominal focal length even when they are of the same make and model. The cam therefore has to be finished by hand to suit the individual lens, and the cam mechanism is consequently expensive and ill suited to mass production.

Since negatives or transparencies and prints are normally made in certain standard sizes, the printer or enlarger is generally used at certain fixed magnifications requiring discrete positions of the objective lens.

It is therefore an object of the present invention to provide an improved photographic printing or enlarging apparatus incorporating convenient means for setting or fixing the position of an objective lens relative to the plane of a photographic negative to be printed.

It is another object of the present invention to provide an improved photographic printing or enlarging apparatus incorporating a positioning device that may be preset to provide a sharply focused image on printing paper when a negative or transparency of a particular size is to be used in the production of a particular print size.

It is still another object of the present invention to provide an improved photographic printing or enlarging apparatus incorporating a positioning device that can accurately and quickly be used to provide the proper objective lens positioning.

It is still a further object of the present invention to provide a photographic printing or enlarging apparatus incorporating a positioning device having one or more push rods which are mounted so as to engage the lens stage, or a part of the lens stage, to accuratetly position the stage relative to the negative carrier.

These and other objects of the present invention will become apparent to those skilled in the art as the description thereof proceeds.

Briefly, the invention provides a photographic printing or enlarging apparatus comprising a carrier for a negative to be printed, a lens stage movable toward and away from the negative carrier and yieldably urged in one of those directions, and a positioning device comprising a body and one or more push rods which are so mounted in or on, and releasably secured to the body as to enable it to be moved in the direction of its length, and secured against movement relative to the body, the arrangement being such that the device can be secured to a part of the apparatus fixed relative to the negative carrier so that a selected push rod engages the lens stage (or a part of the apparatus connected to the lens stage) and adjusts the position of the lens stage relative to the negative carrier to a position determined by the setting of that push rod relative to the body of the device.

Preferably, the lens stage is yieldably urged toward the original carrier. The positioning device may include at least two push rods, the axes of which are preferably parallel to one another. The device may be arranged to be secured to the apparatus by means of a nut on a threaded portion of a shaft fixed to the apparatus and passing through a hole in the body of the device parallel with a selected push rod. The device may include a turret which can be rotated in order to bring a different push rod into operation.

Alternatively, the positioning device may have only a single push rod and be arranged to be secured to the apparatus by means of a locking member which, when the push rod is in its operating position, can be moved into or out of engagement with some part of the apparatus by rotating the device about the axis of the push rod. Advantageously, the locking member is held, when in its operating position, between two parts resiliently biased toward one another.

The position of the objective lens can therefore be set by the action of a selected push rod, or the single push rod, by securing the positioning device to the apparatus with the push rod in its operating position. The objective lens is thus brought to a given position that depends on the setting of the push rod (or the selected push rod) relative to the body of the device. The user may therefore readily adjust the position of objective lens among a plurality of discrete positions (each of which he has previously determined by adjustment of each push rod on the device or the push rod on each of a plurality of devices) either by bringing a different push rod into an operative position or by substituting another device with a push rod set differently.

The present invention may be more readily described by reference to the accompanying drawings, in which:

FIG. 4 is another view, partly in section, of the positioning device of FIG. 2.

FIG. 5 is another view of the positioning device of FIG. 4, but in a different operative position.

FIG. 6 is a plan view of part of the device of FIG. 4.

FIG. 7 is a plan view of part of the device of FIG. 4.

Figure 1:
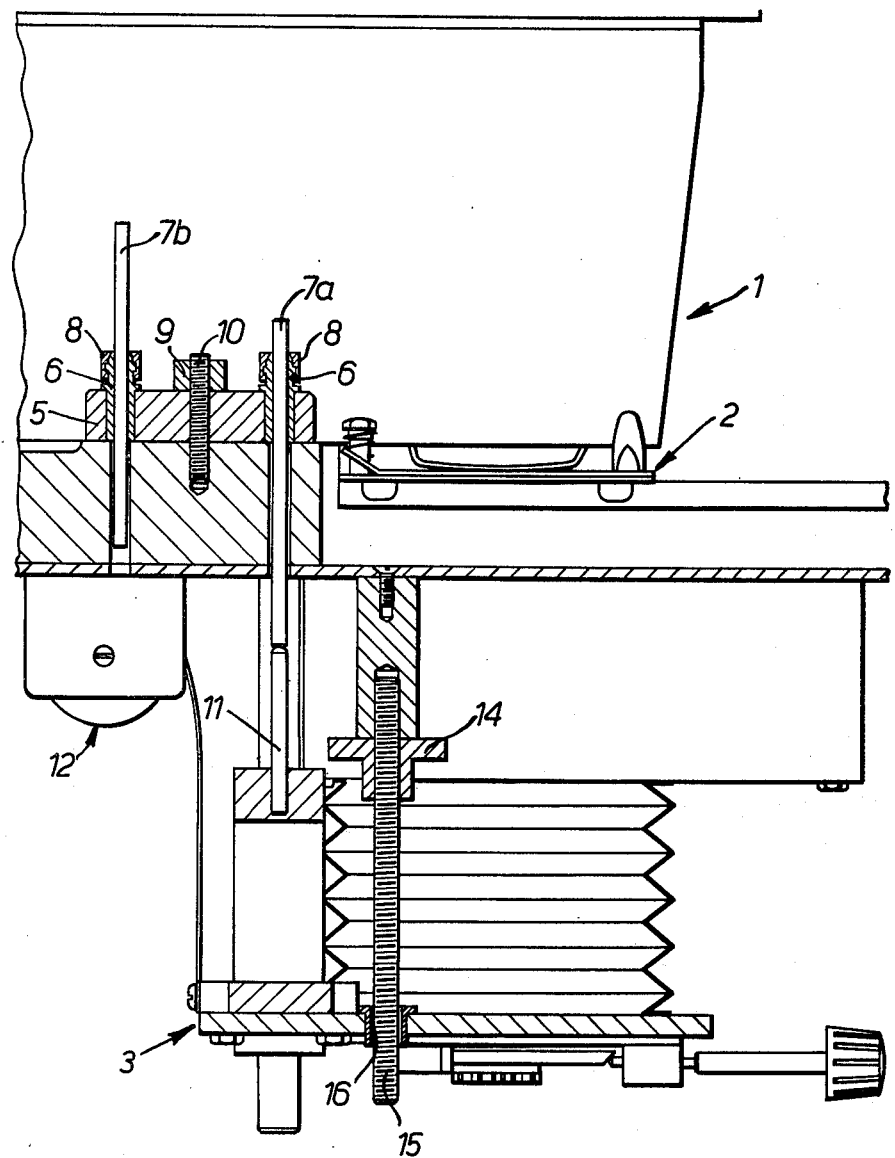
FIG. 1 is a vertical section through a part of a photographic enlarging apparatus constructed in accordance with the teachings of the present invention.
Figure 2:
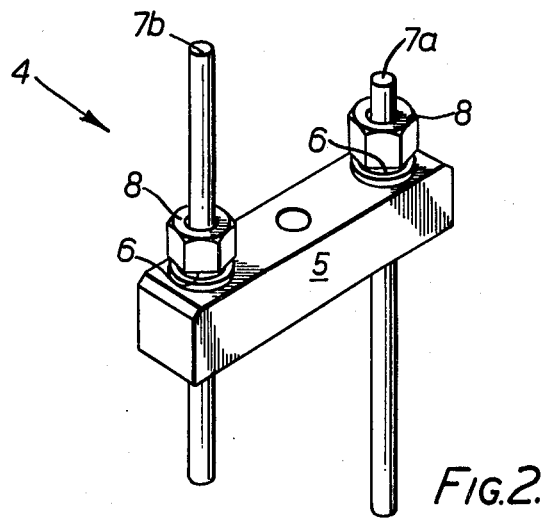
FIG. 2 is a perspective view, somewhat enlarged, of a part of the apparatus of FIG. 1 showing the positioning device of the apparatus.
Figure 3:
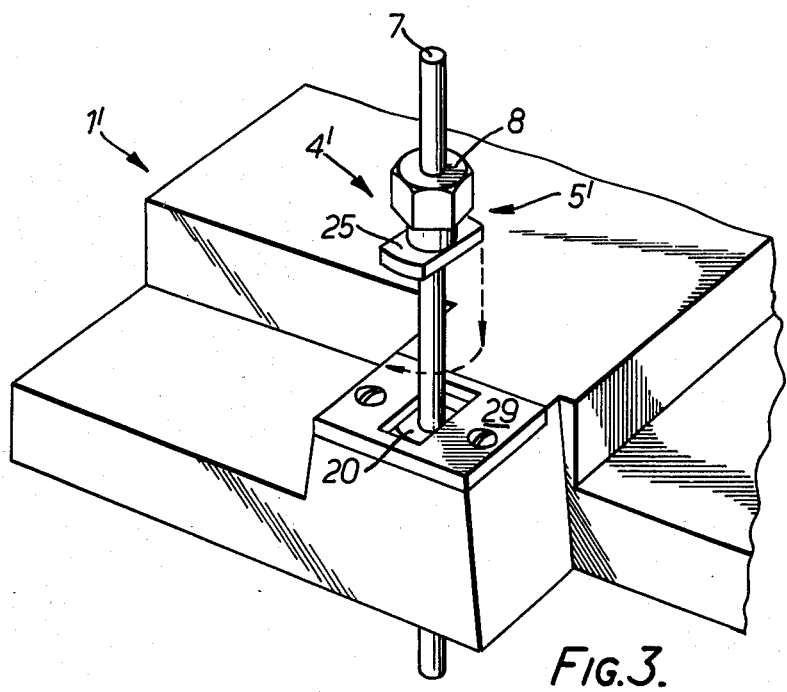
FIG. 3 is a perspective view of a modified form of the positioning device for use in the apparatus of FIG. 1.

Referring to FIGS. 1 and 2 of the accompanying drawings, the first form of printing apparatus comprises a fixed printing head. The plane of the printing paper (not shown) is movable with respect to the printing head and may be set to any desired distance within a given range from the printing head. The printing head 1 includes a negative carrier 2. Below the printing head is a lens stage 3 which is so mounted that it can move only toward or away from the negative carrier 2, and which is connected to the printing head by a collapsible bellows to prevent stray light from entering the objective.

The apparatus also includes a device which is indicated generally be the reference numeral 4 and which is used to locate the objective lens at one of two predetermined distances from the printing paper. The device 4 comprises a body portion and two sleeves 6 which are fixed in parallel bores extending through the body 5. The upper portions of the sleeves 6 (as shown in FIG. 1) project beyond the body 5, are externally threaded and have upper end portions with conically tapered outer surfaces. The upper end portions are slit by longitudinal slots extending from their upper ends into the threaded portions in a manner such as that shown in FIG. 4. A nut 8 having a lower internally threaded portion and an upper portion with an internal frusto-conical face is threaded onto the upper portion of each sleeve 6 so that the frusto-conical face of the nut 8 engages with the frusto-conical upper end portion of the sleeve 6. Push rods 7a and 7b pass through the sleeves 6 and are secured in place by tightening the nuts 8 so that the divided end portions of the sleeves 6 are pressed against the push rods by the wedge action of the frusto-conical faces of the nuts 8 and the end portions of the sleeves 6. The setting of a push rod may be altered whenever desired by slackening the corresponding nut 8 securing that push rod, moving the push rod to a desired new position, and tightening the nut 8. The device is secured to the printing head 1 by means of a nut 9 on a threaded shaft 10 which is fixed to the printing head 1 and which passes through a bore in the body portion 5 of which the axis is parallel to the axes of the sleeves 6 and which is symmetrically placed between them so that one push rod 7a passes through a bore provided in the printing head 1 for the purpose, and the lower end of the push rod 7a engages the upper end of a push rod 11 which is fixed to the lens stage 3 and can push the lens stage 3 away from the printing head against the action of a return spring 12 which is mounted on a drum which is secured to the underside of the printing head.

The other of the push rods 7b passes through another bore formed in the printing head 1 and has no effect on the position of the lens stage 3. When it is desired to change the position of the lens stage, the device 4 is removed, turned round through 180° and replaced so that the other push rod 7b engages the push rod 11 fixed to the lens stage 3. Instead, the device 4 may be removed and replaced by another such device with differently set push rods.

Instead of a device such as that described above, a turret carrying three or more push rods evenly spaced in a circle around the central bore for the shaft 10 may be used, provided that some provision, such as extra bores in the printing head 1, to prevent those push rods not in use from fouling the printing head 1 is made. In this case, of course, the angle through which the turret was rotated when selecting a different push rod would be some multiple of 360° divided by the number of push rods on the turret.

The lens stage 3 may be set at positions other than those for which there are position setting devices by means of a focussing wheel 14 on a threaded shaft 15 which passes through a clearance hole 16 in the lens stage 3. When the focussing wheel 14 is at the top of its travel, as shown in FIG. 1, the shaft 15 can slide freely through the hole 16 and the lens stage 3 can move under the action of the spring 12 and the push rod 7a. When it is desired to use the adjusting wheel 14, it is run down the shaft 15 so that its lower end meets the rim surrounding the hole 16 and pushes the lens stage 3 to any desired position within its range against the action of the spring 12.

Referring to FIGS. 3 to 7 of the drawings, the second form of apparatus is similar to the first form except that it includes a different form of positioning device, which is indicated generally by the reference numeral 4'. The device 4' comprises a body 5' which consists of a flat, oblong lower portion 25 and a cylindrical sleeve portion 6', the central bore of the sleeve portion 6' continuing through the lower portion 25. A single push rod 7 passes through the bore and is secured in place by a nut 8 on the sleeve 6' in the manner described above with reference to the sleeves 6, push rods 7a and 7b and nuts 8 of the first form of the apparatus. The printing head 1' is provided with a cylindrical chamber 26 with a wider top part 28 and a cover plate 29 which will normally be removed only for repairs. In the chamber 26 is a sleeve 20 which is urged upward by a spring 12' acting in compression between the sleeve and the bottom of the chamber.

In use, the device is inserted, as shown in FIG. 4, with the push rod 7 passing through the rectangular opening 21 in the cover plate 29, the hollow center of the sleeve 20 and the spring 21', and a bore in the bottom of the chamber. The lower end of the push rod engages a push rod 11 connected to the lens stage 3'. The device is then pushed down so that the oblong portion 25 passes through the opening 21 and presses down the sleeve 20 against the action of the spring 12' until the member 25 is clear of the lower surface of cover plate 29. The device is then rotated so that the oblong portion 25 rotates within the wider top part 28 of the chamber 26 until it meets a stop 22. If the device 4' is then released, the oblong portion 25 is held with its end portions engaging the underside of the cover plate 29 adjacent to the sides of the opening 21 by the sleeve 20 which is urged against it by the spring 12', as shown in FIG. 5, and the push rod 7 is held in a position determined by the position on it at which the body 5' is set. The motion used to fit the member 25 through the cover plate 29 and lock it in position is indicated by the broken line 30 in FIG. 3. Thus, the lens stage 3' is brought to a position determined by the setting of the push rod 7.

If now it is desired to change the position of the lens stage 3', the device 4' is removed by reversing the procedure described above and it is replaced by another such device having a differently set push rod.

We claim:

1. Photographic reproduction apparatus comprising: a negative carrier, a lens stage movable towards and away from the carrier and yieldably urged in one of those directions and a positioning device comprising a single push rod releasably secured to the body for movement in the direction of its length and arranged to be extending to an operative position and secured against movement relative to the body and held in that position by means of a locking member which, when the push rod is in its operating position, can be moved into or out of locking engagement by rotating the positioning device about the axis of the push rod; means securing said positioning device to a part of the apparatus fixed relative to the negative carrier so that the push rod engages the lens stage, or a part of the apparatus connected to the lens stage, and fixes the position of the lens stage relative to the negative carrier to a position determined by the setting of the push rod relative to said body.

2. Apparatus as claimed in claim 1 wherein the locking member is held, when in its operating position, between two parts resiliently biased toward one another.

3. A positioning device useable in photographic reproduction apparatus for positioning a lens stage movable in a direction toward and away from a negative carrier, said positioning device comprising in combination:
- (a) a body, said body including means for mounting said body in a fixed position relative to the negative carrier;
- (b) at least one push rod, said push rod being repositionable along its axis and movable in the direction of its length relative to said body;
- (c) means for releasably securing said push rod with said body at a predetermined positional relationship with respect to said body;
- (d) means for positioning the lens stage relative to the negative carrier commensurate with and regulated by the positional relationship of only one of said push rods with respect to said body; and
- (e) means for yieldingly urging the lens stage to maintain its position relative to the negative carrier established by said positioning means interacting with said push rod;

whereby, the positional relationship between the lens stage and the negative carrier is adjustably and repetitively maintainable by said push rod.

4. The positioning device as set forth in claim 3 wherein said urging means urges the lens stage toward the negative carrier.

5. The positioning device as set forth in claims 3 or 4 wherein said securing means comprises:
- (a) a sleeve extending through said body for receiving said push rod, one end of said sleeve having an externally threaded portion and having a longitudinal slot; and
- (b) a nut having an internally threaded portion for threadably engaging said threaded portion of said sleeve for pressing said sleeve against said push rod and for securing said push rod to said body.

6. A positioning device useable in photographic reproduction apparatus for positioning a lens stage movable in a direction toward and away from a negative carrier, said positioning device comprising in combination:
- (a) a body, said body including means for mounting said body relative to the negative carrier;
- (b) at least two push rods, each of said push rods being repositionable along its axis relative to said body;
- (c) means for releasably securing each of said push rods with said body at a predetermined positional relationship with respect to said body;
- (d) means for positioning the lens stage relative to the negative carrier commensurate with and regulated by the positional relationship of only a selected one of said push rods with respect to said body; and
- (e) means for yieldingly urging the lens stage to maintain its position relative to the negative carrier established by said positioning means interacting with said selected one of said push rods;

whereby, the lens stage can be repetitively positioned at more than one position with respect to the negative carrier.

7. The positioning device as set forth in claim 6 wherein the axis of said push rods are parallel to one another.

* * * * *